United States Patent Office 2,789,127
Patented Apr. 16, 1957

2,789,127

PROCESS FOR THE MANUFACTURE OF 2,6-DIMETHYL - 8-(2,6,6 - TRIMETHYL - 1 - CYCLOHEXENYL)-2,4,6-OCTATRIENE-1-AL

Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application June 28, 1954,
Serial No. 439,862

Claims priority, application Switzerland July 7, 1953

9 Claims. (Cl. 260—468)

This invention relates to an improvement in the synthesis of the compound 2,6-dimethyl-8-(2,6,6-trimethyl-1-cyclohexenyl)-2,4,6-octatrien-1-al. The above identified compound, often referred to by the abbreviated designation "$\beta$-$C_{19}$-aldehyde," is useful in the synthesis of $\beta$-carotene, as described in the prior publications of Inhoffen and collaborators, see for instance "Annalen der Chemie" 570, 54 (1950) and 571, 75 (1951).

The process provided by the present invention comprises reacting 2-methyl-4-(2,6,6-trimethyl-1-cyclohexenyl)-2-buten-1-al ($\beta$-$C_{14}$-aldehyde) with a haloacetic acid lower alkyl ester, subjecting the condensation product formed to a sequence of steps comprising a treatment with a dehydration agent and a treatment with a reducing agent to produce 4-methyl-6-(2,6,6-trimethyl-1-cyclohexenyl)-2,4-hexadien-1-ol ($\beta$-$C_{16}$-alcohol), subjecting the latter to an oxidation, condensing the 4-methyl-6-(2,6,6 - trimethyl-1-cyclohexenyl)-2,4-hexadien-1-al ($\beta$-$C_{16}$-aldehyde) formed with a $\alpha$-halopropionic acid lower alkyl ester, subjecting the condensation product formed to a sequence of steps comprising a treatment with a dehydration agent and a treatment with a reducing agent, and oxidizing the 2,6-dimethyl-8-(2,6,6-trimethyl-1-cyclohexenyl)-2,4,6-octatrien-1-ol ($\beta$-$C_{19}$-alcohol) formed to produce 2,6-dimethyl-8-(2,6,6-trimethyl-1-cyclohexenyl)-2,4,6-octatrien-1-al ($\beta$-$C_{19}$-aldehyde).

Additional aspects of the invention are exemplified by the novel intermediates referred to in this application as $\beta$-$C_{16}$-hydroxyester, $\beta$-$C_{16}$-ester, $\beta$-$C_{16}$-epoxyester, $\beta$-$C_{16}$-alcohol, $\beta$-$C_{16}$-diol, $\beta$-$C_{19}$-hydroxyester, $\beta$-$C_{19}$-ester and $\beta$-$C_{19}$-alcohol, and the novel processes herein disclosed of making these intermediates; as well as the novel steps herein disclosed of converting the said new intermediates into $\beta$-$C_{19}$-aldehyde.

The first step in the procedure described in detail below comprises the condensation of $\beta$-$C_{14}$-aldehyde with a haloacetic acid lower alkylester. This can be accomplished according to procedures known per se. For example, the condensation can be effected by reaction of the aldehyde with an ester of a haloacetic acid in the presence of a condensation agent, for example a metal, such as zinc, sodium, or an alkali alcoholate, such as sodium methylate. In a preferred exemplification of the process, the $\beta$-$C_{14}$-aldehyde is condensed in a Reformatsky reaction with a bromoacetic acid lower alkyl ester to produce 4 - methyl-6-(2,6,6-trimethyl-1-cyclohexenyl)-4-hexen-3-hydroxy-1-oic acid lower alkyl ester ($\beta$-$C_{16}$-hydroxyester) in the form of a viscous oil. An alternative procedure consists in condensing the $\beta$-$C_{14}$-aldehyde by means of sodium methylate with chloroacetic acid lower alkylester, which reaction leads to the formation of 4-methyl - 6 - (2,6,6-trimethyl-1-cyclohexenyl)-4-hexen-2,3-epoxy-1-oic acid lower alkyl ester ($\beta$-$C_{16}$-epoxyester). This $\beta$-$C_{16}$-epoxyester can easily be converted into the corresponding keto-acid ester and the latter in turn into the $\beta$-$C_{16}$-hydroxyester. By treating the $\beta$-$C_{16}$-epoxyester further according to the present synthesis the same final products will be obtained as those produced by treating in same manner the $\beta$-$C_{16}$-hydroxyester. Special purification thereof, e. g. by distillation, is not necessary for further processing according to the invention.

In the second and third steps of the synthesis, the $\beta$-$C_{16}$-hydroxyester or the $\beta$-$C_{16}$-epoxyester, respectively, are subjected to the sequence of steps comprising treatment with a dehydration agent and a treatment with a reducing agent. This can be accomplished according to procedures customary for polyene compounds. Upon dehydration, one molecule of water is split off from positions 2,3. The treatment with a reducing agent brings about a substitution in position 1 of a primary hydroxy group for the ester group. In a preferred exemplification of these two steps, the $\beta$-$C_{16}$-hydroxyester is first subjected to dehydration, whereupon the ester group is reduced to produce a primary hydroxy group. The dehydration is suitably performed by heating the $\beta$-$C_{16}$-hydroxyester in a solvent, such as toluene or xylene, in the presence of an acidic dehydration agent, such as p-toluene sulfonic acid, the water formed being continuously eliminated by azeotropic distillation. The 4-methyl-6-(2,6,6-trimethyl-1-cyclohexenyl)-2,4-hexadien-1-oic acid lower alkyl ester ($\beta$-$C_{16}$-ester) thus formed is a viscous oil, which shows an absorption maximum in the ultraviolet spectrum at 272.5 m$\mu$. The reduction of the $\beta$-$C_{16}$-ester may for example be carried out by means of lithium aluminium hydride. The $\beta$-$C_{16}$-alcohol produced shows an absorption maximum in the ultraviolet spectrum at 237.5 m$\mu$, $E=24500$ (in methanol). The $\beta$-$C_{16}$-alcohol may also be produced by inversing the sequence of steps, i. e. by first reducing the $\beta$-$C_{16}$-hydroxyester or the $\beta$-epoxyester and by subsequent treatment with a dehydrating agent. Thereby, the reduction, for example by means of lithium aluminum hydride, leads to the formation of 4-methyl-6-(2,6,6-trimethyl-1-cyclohexenyl)-4-hexen-1,3-diol ($\beta$-$C_{16}$-diol), the primary hydroxy group of which should suitably be protected by esterifying the same before subjecting the $\beta$-$C_{16}$-diol to subsequent dehydration.

In the fourth step of the procedure, the $\beta$-$C_{16}$-alcohol is converted into the $\beta$-$C_{16}$-aldehyde by treatment with an oxidation agent. To this end, the oxidation agents usually used in connection with polyene compounds may be employed, for example manganese dioxide, tertiary butyl chromate, acetone in connection with aluminium isopropylate (preferably in the presence of aniline) etc. It is especially recommended to carry out the oxidation by means of manganese dioxide in excess in an inert solvent, such as petroleum ether. The $\beta$-$C_{16}$-aldehyde obtained, which possesses a marked tendency to crystallise, melts at 78–79° C. It shows an absorption maximum in the ultraviolet spectrum of 284 m$\mu$, $E=30600$ (in alcohol) and at 275 m$\mu$, $E=31750$ (in petroleum ether). The semicarbazone thereof melts at 211–212° C. and the corresponding 2,4-dinitrophenylhydrazone at 200–201° C.

The fifth step of the process disclosed herein consists in condensing $\beta$-$C_{16}$-aldehyde with a $\alpha$-halopropionic acid lower alkyl ester. The operations to be followed to this end are substantially analogous to those already described before in respect of the first step of the process. In a preferred exemplification of the fifth step, the $\beta$-$C_{16}$-aldehyde is condensed by means of a Reformatsky reaction with an $\alpha$-bromopropionic acid lower alkyl ester. The 2,6 - dimethyl - 8 - (2,6,6 - trimethyl-1-cyclohexenyl)-4,6-octadien-3-hydroxy-1-oic acid lower alkyl ester ($\beta$-$C_{19}$-hydroxyester) thus produced is a viscous oil, which shows in the ultraviolet spectrum an absorption maximum at 239 m$\mu$ (in alcohol). For further processing, it is unnecessary to subject the $\beta$-$C_{19}$-hydroxyester to special purification procedures, such as distillation.

In the sixth and seventh steps of the synthesis, the β-$C_{19}$-hydroxyester is subjected to a dehydration and to reduction, and in the eighth step, the β-$C_{19}$-alcohol produced is oxidized to form the β-$C_{19}$-aldehyde. The details of the procedure are substantially analogous to those already described for the performance of the corresponding second, third and fourth steps of the synthesis. In a preferred mode of operation, the β-$C_{19}$-hydroxyester is heated in an inert solvent, such as toluene or xylene, in the presence of an acidic dehydration agent, such as p-toluene sulfonic acid, the water formed being continuously eliminated by azeotropic distillation. The 2,6-dimethyl-8-(2,6,6-trimethyl-1-cyclohexenyl)-2,4,6-octatrien-1-oic acid lower alkyl ester (β-$C_{19}$-ester) produced shows an absorption maximum in the ultraviolet spectrum at 310 mμ (in alcohol), and may be converted by reduction with lithium aluminium hydride into β-$C_{19}$-alcohol. The latter may in turn be oxidized by means of manganese dioxide to yield β-$C_{19}$-aldehyde.

The β-$C_{19}$-aldehyde obtained according to the process described hereinbefore melts at 62–63° C.; boiling point 130–132° C./0.03 mm. The said aldehyde possesses a marked tendency to crystallize in petroleum ether.

EXAMPLE 1

β-$C_{16}$-hydroxyester

A mixture of 206 g. of 2-methyl-4-(2,6,6-trimethyl-1-cyclohexenyl)-2-buten-1-al, 175 g. of bromoacetic acid ethylester and 1000 cc. of absolute ether were added, with stirring, to 90 g. of granulated zinc at such a rate that the mixture boiled with reflux. After the addition was completed boiling was continued for 5 minutes. The mixture was allowed to cool and was then poured on to a mixture of ice and 1000 cc. of 3 N-sulfuric acid. The ether solution was separated and successively washed with water, with 5 percent sodium bicarbonate solution and again with water. After drying with sodium sulfate and evaporating the ether, there were obtained 310 g. of 4-methyl-6-(2,6,6-trimethyl-1-cyclohexenyl)-4-hexen-3-hydroxy-1-oic acid ethylester, which was purified by distilling in high vacuo. Boiling point 130–135° C./0.02 mm.; $n_D^{25}$=1.4935; yield 258 g.=88 percent.

EXAMPLE 2

β-$C_{16}$-ester 140 g. of 4-methyl-6-(2,6,6-trimethyl-1-cyclohexenyl)-4-hexen-3-hydroxy-1-oic acid ethyl ester were heated to boiling in 500 cc. of toluene with 1.4 g. of p-toluene sulfonic acid for 2 hours, during which time 200 cc. of toluene distilled off with the water produced by the reaction. After cooling, the toluene solution was washed with 5 percent sodium bicarbonate solution and with water. The toluene was distilled off in vacuo and the 4-methyl-6-(2,6,6-trimethyl-1-cyclohexenyl)-2,4-hexadien-1-oic acid ethyl ester obtained was purified by distilling in high vacuo. Boiling point 118–119° C./0.04 mm.; $n_D^{25}$=1.5237; U. V. Max.: 272.5 mμ, E=23600 (in ethanol); yield 118.5 g.=90.5 percent.

EXAMPLE 3

β-$C_{16}$-alcohol

A mixture of 66 g. of 4-methyl-6-(2,6,6-trimethyl-1-cyclohexenyl)-2,4-hexadien-1-oic acid ethyl ester and 400 cc. of absolute ether was slowly added, while cooling externally with ice, to 9 g. of lithium aluminium hydride in 100 cc. of absolute ether. The mixture was then refluxed for 30 minutes. It was allowed to cool, whereupon 30 cc. of ethyl acetate were slowly added. The mixture was then poured on to a mixture of ice and 800 cc. of 3 N-sulfuric acid. The ether solution was separated and washed with 5 percent sodium bicarbonate solution and with water. After drying with sodium sulfate and evaporating the ether, 56 g. of 4-methyl-6-(2,6,6-trimethyl-1-cyclohexenyl)-2,4-hexadien-1-ol remained. This product boils at 120° C./0.04 mm.; $n_D^{24}$=1.5312; U. V. Max.: 237.5 mμ, E=24500 (in alcohol); yield: 53 g.=95 percent.

EXAMPLE 4

β-$C_{16}$-aldehyde 51.5 g. of 4-methyl-6-(2,6,6-trimethyl-1-cyclohexenyl)-2,4-hexadien-1-ol were shaken with 250 g. manganese dioxide in 500 cc. of dried petroleum ether (boiling range 30–60° C.) for 12 hours at room temperature. The mixture was then filtrated and the manganese dioxide was washed with 1000 cc. of ether. After drying with sodium sulfate, the filtrate was freed from the solvent, whereupon 49.5 g. of crude 4-methyl-6-(2,6,6-trimethyl-1-cyclohexenyl)-2,4-hexadien-1-al were obtained. U. V. Max.: 235 mμ, E=24000 (in alcohol), yield: 75 percent. The product was crystallized from petroleum ether. Melting point 78–79° C.; U. V. Max.: 285 mμ, E=31000 (in alcohol).

EXAMPLE 5

β-$C_{19}$-hydroxyester 23.2 g. of 4-methyl-6-(2,6,6-trimethyl-1-cyclohexenyl)-2,4-hexadien-1-al, 19.5 g. of α-bromopropionic acid ethyl ester in 100 cc. of absolute ether were refluxed for 2½ hours with 8 g. of granulated zinc. Then the mixture was poured on ice and 200 cc. of 3 N-sulfuric acid, the ether layer was separated and washed with a 5 percent sodium bicarbonate solution and with water. After drying and evaporating the ether, there were obtained 32.5 g. of 2,6-dimethyl-8-(2,6,6-trimethyl-1-cyclohexenyl)-4,6-octadien-3-hydroxy-1-oic acid ethylester.

$$n_D^{25}=1.5125$$

U. V. Max.: 239 mμ, E=30000 (in alcohol); yield 97 percent.

EXAMPLE 6

β-$C_{19}$-ester 32 g. of 2,6-dimethyl-8-(2,6,6-trimethyl-1-cyclohexenyl)-4,6-octadien-3-hydroxy-1-oic acid ethyl ester were heated to boiling in 200 cc. of toluene with 0.3 g. of p-toluene sulfonic acid for 2 hours, during which time 100 cc. of toluene distilled off together with the water produced. After cooling the toluene solution was washed with 5 percent sodium bicarbonate solution and with water. The toluene was distilled off in vacuo, whereupon the 2,6-dimethyl-8-(2,6,6,-trimethyl-1-cyclohexenyl)-2,4,6-octatrien-1-oic acid ethyl ester was purified by distilling in high vacuo. Boiling point 132° C./0.015 mm.; $n_D^{20}$=1.5425; U. V. Max.: 310 mμ, E=24600 (in alcohol); yield 22.7 g.=77.5 percent.

EXAMPLE 7

β-$C_{19}$-alcohol

A mixture of 19.6 g. of 2,6-dimethyl-8-(2,6,6-trimethyl-1-cyclohexenyl)-2,4,6-octatrien-1-oic acid ethyl ester and 80 cc. of absolute ether were slowly added, while cooling with ice to 2.35 g. of lithium aluminum hydride in 70 cc. of absolute ether. Then the mixture was refluxed for ½ hour. After cooling, 10 cc. of ethyl acetate were slowly added and the mixture was poured on ice and 100 cc. of 3 N-sulfuric acid. The ether layer was separated and washed with 5 percent sodium bicarbonate solution and with water. After drying and distilling off the ether, there were obtained 17 g. of 2,6-dimethyl-8-(2,6,6-trimethyl-1-cyclohexenyl)-2,4,6-octatrien-1-ol; yield 100 percent; $n_D^{24}$=1.5503; U. V. Max.: 278.5 mμ; E=28000 (in alcohol).

EXAMPLE 8

β-$C_{19}$-aldehyde 16.5 g. of 2,6-dimethyl-8-(2,6,6-trimethyl-1-cyclohexenyl)-2,4,6-octatrien-1-ol were shaken in 200 cc. of dry petroleum ether (boiling range 30–60° C.) with 80 g. of manganese dioxide for 12 hours at room temperature.

The mixture was filtrated and the manganese dioxide was washed with 500 cc. of ether. After drying with sodium sulfate and removal of the solvent by distillation, 16.1 g. of crude 2,6 - dimethyl - 8 - (2,6,6 - trimethyl - 1 - cyclohexenyl)-2,4,6-octatrien-1-al were obtained; absorption maximum in the ultraviolet spectrum at 328 m$\mu$, $E$=28000 (in alcohol), yield 60 percent. The product crystallized from petroleum ether; melting point 62–63° C.; U. V. Max.: at 328 m$\mu$, $E$=45500 (in alcohol).

We claim:

1. A process which comprises reacting 2-methyl-4-(2,6,6-trimethyl-1-cyclohexenyl)-2-buten-1-al with a haloacetic acid lower alkyl ester, subjecting the condensation product formed to a sequence of steps comprising a treatment with a dehydration agent and a treatment with a reducing agent to produce 4-methyl-6-(2,6,6-trimethyl-1-cyclohexenyl)-2,4-hexadien-1-ol, subjecting the latter to an oxidation, condensing the 4-methyl-6-(2,6,6-trimethyl-1-cyclohexenyl)-2,4-hexadien-1-al formed with a $\alpha$-halopropionic acid lower alkyl ester, subjecting the condensation product formed to a sequence of steps comprising a treatment with a dehydration agent and a treatment with a reducing agent, and oxidizing the 2,6-dimethyl - 8 - (2,6,6 - trimethyl - 1 - cyclohexenyl)-2,4,6-octatrien-1-ol formed to produce 2,6-dimethyl-8-(2,6,6-trimethyl-1-cyclohexenyl)-2,4,6-octatrien-1-al.

2. The process of claim 1, wherein the 2-methyl-4-(2,6,6 - trimethyl - 1 - cyclohexenyl) - 2 - buten - 1 - al is condensed by means of a Reformatsky reaction with a bromoacetic acid lower alkyl ester and the 4-methyl-6 - (2,6,6 - trimethyl - 1 - cyclohexenyl) - 4 - hexen - 3-hydroxy-1-oic acid lower alkyl ester produced is heated in an inert solvent with an acidic dehydration agent, the water formed being continuously eliminated by azeotropic distillation.

3. The process of claim 1, wherein the oxidation of the 4 - methyl - 6 - (2,6,6 - trimethyl - 1 - cyclohexenyl)-2,4-hexadien-1-ol is achieved by treatment with manganese dioxide in excess in an inert solvent.

4. The process of claim 1, wherein the 4-methyl-6-(2,6,6 - trimethyl - 1 - cyclohexenyl) - 2,4 - hexadien-1-al is condensed in a Reformatsky reaction with a $\alpha$-bromopropionic acid lower alkyl ester, and the 2,6-dimethyl - 8 - (2,6,6 - trimethyl - 1 - cyclohexenyl) - 4,6-octadien-3-hydroxy-1-oic acid lower alkyl ester produced is heated in an inert solvent with an acidic dehydration agent, the water produced being continuously eliminated by azeotropic distillation.

5. 4 - methyl - 6 - (2,6,6 - trimethyl - 1 - cyclohexenyl)-2,4-hexadien-1-ol.

6. 4 - methyl - 6 - (2,6,6 - trimethyl - 1 - cyclohexenyl)-4-hexen-3-hydroxy-1-oic acid lower alkyl ester.

7. 2,6 - dimethyl - 8 - (2,6,6 - trimethyl - 1 - cyclohexenyl)-4,6-octadien-3-hydroxy-1-oic acid lower alkyl ester.

8. 4 - methyl - 6 - (2,6,6 - trimethyl - 1 - cyclohexenyl)-4-hexen-3-hydroxy-1-oic acid ethyl ester.

9. 2,6 - dimethyl - 8 - (2,6,6 - trimethyl - 1 - cyclohexenyl)-4,6-octadien-3-hydroxy-1-oic acid ethyl ester.

References Cited in the file of this patent

UNITED STATES PATENTS 2,576,103    Cawley et al. _____ Nov. 27, 1951